Patented July 21, 1942

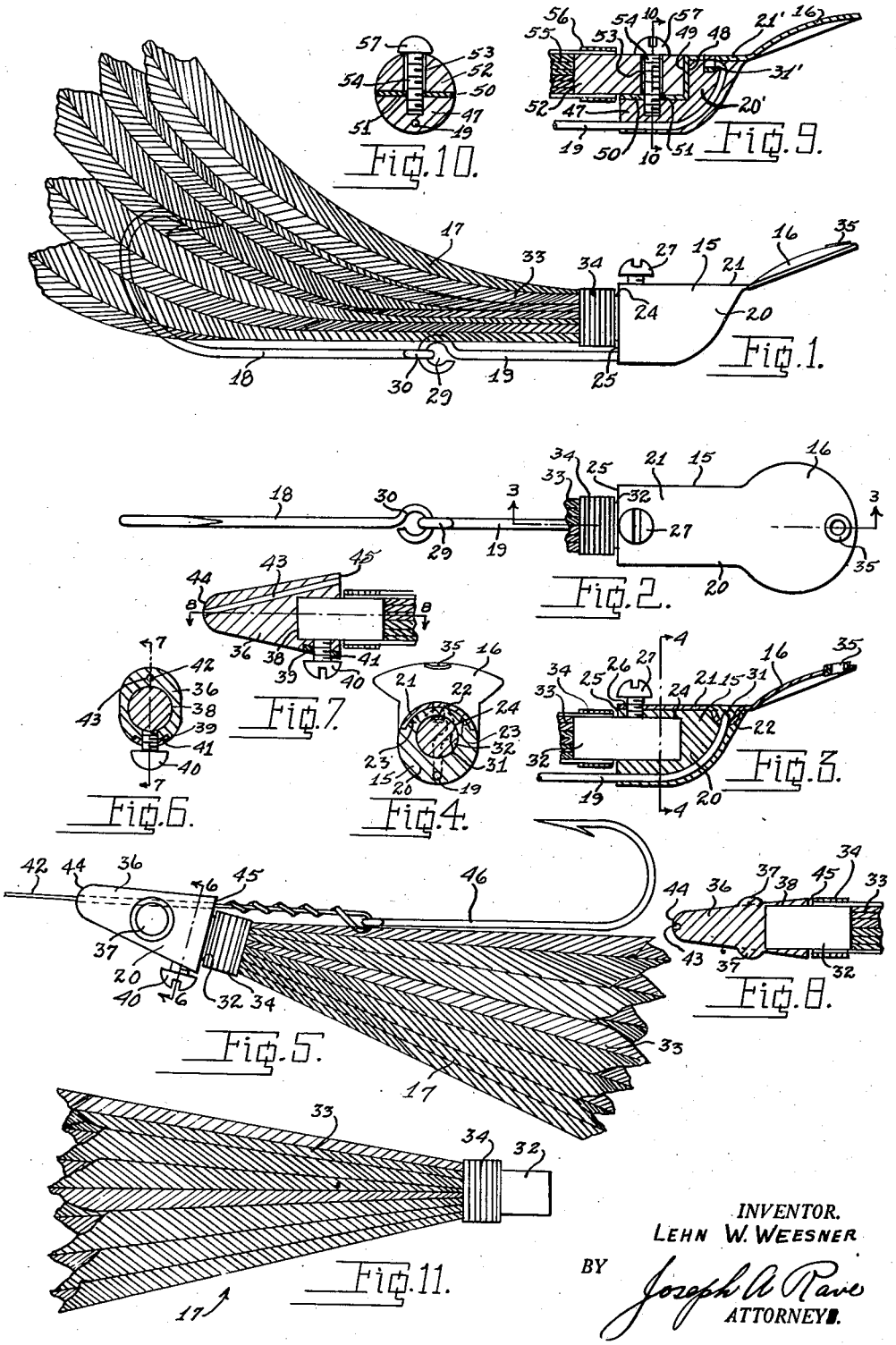

2,290,512

UNITED STATES PATENT OFFICE 2,290,512

FISHING LURE

Lehn W. Weesner, Cincinnati, Ohio, assignor, by direct and mesne assignments, to himself and The Weezel Bait Company, Cincinnati, Ohio, a corporation of Ohio Application December 8, 1938, Serial No. 244,650

10 Claims. (Cl. 43—42)

This invention relates to improvements in fishing lures, and particularly to such lures which are provided with feathers, tail hairs and the like, and in which these feathers, hairs and the like are employed to enhance or embellish the lure, shroud the hook or agitate the water during use.

In the past, so-called feathered lures have been employed in which the feathers, hairs and the like have been permanently attached to the body of the lure so that should these feathers, hairs or the like become damaged, broken or lost, it was necessary to discard the lure and purchase an entirely new one. This difficulty of breaking or damaging the feathers, hairs or the like is particularly encountered in game or semi-game fishing which is practiced in salt water and larger fresh water lakes, where these game or semi-game fish abound.

It is therefore one of the principal objects of this invention to provide a fishing lure which is so constructed as to have its feathered or hair portion readily renewed and without necessitating the removal of the lure from the line.

Another object of this invention is the provision of a fishing lure in which the feathers, hair or other shroud and embellishment is made separate and apart from the lure body, and attached thereto after each has been separately completed.

It is also an object of this invention to provide an artificial fishing lure to accomplish the above objects, which, however, retains its properties of simulating the movements of small water animals while being retrieved and drawn through the water.

It is a still further and specific object of this invention to provide a replacement shroud, embellishment or the like for use with artificial lures.

Other objects and advantages of the present invention should be readily apparent by reference to the following specification, considered in conjunction with the accompanying drawing forming a part thereof, and it is to be understood that any modifications may be made in the exact structural details there shown and described, within the scope of the appended claims, and without departing from or exceeding the spirit of the invention.

In the drawing:

Fig. 1 is a side elevation of one form of fish lure embodying improvements of this invention.

Fig. 2 is a top plan view of the lure of Fig. 1 with certain parts cut away.

Fig. 3 is a longitudinal, sectional view through the lure body, taken on line 3—3 of Fig. 2.

Fig. 4 is a transverse, sectional view taken on line 4—4 of Fig. 3.

Fig. 5 is a side elevational view of a second form of an artificial lure embodying the improvements of this invention.

Fig. 6 is a transverse, sectional view taken on line 6—6 of Fig. 5.

Fig. 7 is a longitudinal, vertical, sectional view taken on line 7—7 of Fig. 6.

Fig. 8 is a longitudinal, horizontal, sectional view taken on line 8—8 of Fig. 7.

Fig. 9 is a fragmentary, horizontal, sectional view, similar to Fig. 3, showing modifications in the construction of the lure.

Fig. 10 is a transverse, sectional view taken on line 10—10 of Fig. 9.

Fig. 11 is an elevational view of a refill for use with an artificial lure.

Throughout the several views of the drawings, similar reference characters are employed to denote the same or similar parts.

In the form of the invention illustrated in Figs. 1 to 4 inclusive, the lure comprises a body portion, head portion or plug 15 having projecting forwardly and slightly upwardly relative thereto a lip or tongue portion 16. Projecting rearwardly of the body portion 15 is the shroud, feathered portion or other embellishment 17. More or less hidden by the shroud 17 is a hook 18 having its eye attached to a hook carrying rod 19 projecting from the body portion 15.

The head portion 15, as seen in Figs. 3 and 4, is, in the main, formed of lead 20, suitably molded, and constitutes the body of the lure. As will readily be appreciated from common knowledge in this art, as well as the disclosures in the drawings and later to be described, the molded lead body portion may take any desirable form. Mounted on the upper surface of the body 20, is a plate 21, shown as integral with the lip or tongue 16. Between the plate 21 and lip or tongue 16, a piercing is effected, providing an eye or yoke 22 around which the lead flows to form an anchor for the plate and permanently connecting the plate 21, lip or tongue 16 and body portion 20 to one another. In order to further affect this bond, the plate 21 may have inwardly projecting teeth 23 adapted to be encircled by the lead or other material during the forming of the head 20. In casting the head 20, a socket 24 is formed therein, entering from the rear end 25 of the head. Inwardly of the rear end 25 of the head 15, there is formed a tapped aperture 26 extending through the plate 21 and lead body portion 20 and entering the socket 24. Disposed in this threaded aperture is a clamp screw 27.

The hook attaching rod or bar 19 has its outer end turned on itself to provide the ring 29, which passes through the ring or eye portion 30 of the hook 18. The other end of the bar 19 is within the body portion 20 of the lure and has its inner end hook shaped, as at 31 in Fig. 4, and passes through the opening formed by the piercing or yoke 22 and thereby securely anchors the bar 19 in the lead body 20 as well as affords an additional anchor for securing the plate 21 and lip 16 to the body 20.

Received in the socket 24 is a short plug 32 conforming in cross section to the cross section of the socket 24. Secured to the outer end of the plug 32 are feathers 33, which, however, may be hairs or other material. The attachment of the feathers 33 to the plug 32 may take any desirable form, such as by thread or cord 34, which is a well known expedient, and which is subsequently cemented in position.

The separable shroud 17, including the plug 32, feathers 33 and securing means 34, form a unit independently of the body of the lure and are inserted in the socket 24 and secured in position by the clamping screw 27. It will be appreciated that a certain amount of pressure is exerted by the clamping screw 27 on the plug 32, and which pressure is resisted by the threads of the threaded aperture 26. It is for this reason that the said threaded aperture is formed in the plate 21, which is made from some relatively tough material, such as sheet steel, brass or the like, since, if the threads were formed only in the lead body portion 21, they would soon become stripped and render the lure inoperative.

After the body portion 20 and plate 21 are secured to one another, as in the casting operation, the entire exterior surface of the lure is plated to a uniform finish and then polished, which may take the form of nickel plating, or these parts may, instead, be painted with enamel or some metallic paint, so that the article appears to be of unitary construction, as illustrated in Figs. 1 and 2. In order to attach the lure to a line, the lip or tongue 16 is provided with an aperture for an eyelet 35. It will be appreciated that, should the feathers 33 become damaged or broken, they may be readily replaced by simply releasing the clamp screw 27, withdrawing the plug 32 with the remains of the feathers attached thereto, and a whole new shroud 17 inserted in its place, all without removing the lure from the line and without utilizing an entirely new complete lure.

The lure illustrated in Figs. 5 and 8 inclusive is without the plate or lip 16, and is in the form of a tapered plug 36, resembling the head of a minnow or other small fish. Behind the pointed or nose end 44 thereof, there is provided semi-globular bulges 37, simulating eyes on each side of the head. Within the head, there is formed a socket 38, similar to the socket 24 in the body 20 above described. Extending through the head and communicating with the socket is a threaded aperture 39, similar to the threaded aperture 26 above, and receiving a clamp screw 40. In order to prevent the stripping of the threads when pressure is applied by the clamp screw, the lure body 16 has secured thereto a small arcuate plate 41, see Figs. 6 and 7, around the aperture 39, and which has the threads therein for taking the clamping thrust when securing the shroud or other embellishment 17 within the socket 38. In order to attach this type of lure to the line or leader 42, the body 36 has cast or formed therein a passage 43, extending, as seen in Figs. 5 and 7, from the nose 44 to the back end 45 of the lure. This passage 43 extends at an angle to the mean axis of the lure, so as to avoid the socket 38 therein, and thereby prevent passing anything through the socket which would interfere with the insertion of the embellishment plug 32 therein.

The leader 42, beyond the rear end 45 of the lure, is passed through the eye of a hook 46, all as is usual practice, and with the hook adjacent to the feathers 33 of the embellishment. It will readily be appreciated, as with the form illustrated in Figs. 1 to 4 inclusive, that, if the feathers become broken or damaged, the shroud or embellishment 17 may be readily replaced by releasing the clamping pressure of screw 40 and inserting a new completed refill therein, without removing the lure from the line or leader 42.

With the lures just described, use is made of a socket formed within the cast portion of the body thereof, but it is to be understood that the body may be so formed as to have the removable shroud, embellishment or the like attached directly thereto and exteriorly thereof. Such a construction is illustrated in Figs. 9 and 10, where the lure takes substantially the final form of that illustrated in Figs. 1 to 4 inclusive. As shown in this form, the cast body portion 20′, instead of having the socket 24 formed therein, is provided with a reduced rear portion forming a ledge 47 terminating in a vertical shoulder 48. Mounted on top of the lure cast body 20′ is a plate 21′ having a portion 49 vertically disposed thereto and lying against the shoulder 48, and a further horizontal portion 50 lying on the upper surface of the ledge 47. Intermediate the ends of the horizontal portion 50 of the plate 21′, there is provided a tapped aperture 51, which also extends into the ledge 47.

With this construction of a lure body, the shroud or embellishment plug 52, instead of being circular or of a cross section conforming to that of the socket 24, is semi-circular, and is provided with an aperture 53, located to align with the tapped aperture 51. Passing through the aperture 53 into the tapped aperture 51, is a clamp screw 54, adapted to secure the plug 52 on the ledge 47 of the lure body by clamping same between the clamp screw head 57 and the thread of the tapped aperture 51. The free end of the plug 52 has secured thereto feathers or the like 55 by suitable means, such as the thread or cord 56.

From the foregoing, it will be appreciated that there has been provided a fishing lure of the feathered minnow type, in which the body proper and feathered portions are separately manufactured and subsequently secured to one another, and in which the featured portion may be readily removed or replaced without removing the lure from the line.

What is claimed is:

1. In a fishing lure of the class described, having a body portion cast from relatively soft material, a plug having secured thereto feathers, hair or the like, said plug and cast body portion having complementary seating portions for attaching the plug to the body portion, a plate of relatively tough material associated with the body portion where its nests with the plug and provided with a tapped aperture, and a clamping screw in the tapped aperture for securing the body portion and plug to one another.

2. In a fishing lure of the class described, the combination of a cast body portion of relatively soft material and an overlay of relatively tough material bonded thereto, a socket within the cast body portion, a plug having feathers, hair or the like secured to one end thereof and having its other end within the socket, and a clamping screw for securing the plug in the socket.

3. In a fishing lure of the class described, the combination of a cast body portion of relatively soft material and an overlay of relatively tough material bonded thereto, a socket within the cast body portion, a plug having feathers, hair or the like secured to one end thereof and having its other end within the socket, a clamping screw for securing the plug in the socket, and a lip projecting ahead of the body portion.

4. In a fishing lure of the class described, the combination of a cast body portion of relatively soft material and an overlay of relatively tough material bonded thereto, a socket within the cast body portion, a plug having feathers, hair or the like secured to one end thereof and having its other end within the socket, a clamping screw for securing the plug in the socket, and a lip integral with the overlay of tough material and projecting forwardly of the body portion.

5. In a fishing lure of the class described, the combination of a cast body portion of relatively soft material and an overlay of relatively tough material bonded thereto, a socket within the cast body portion, a plug having feathers, hair or the like secured to one end thereof and having its other end within the socket, a clamping screw for securing the plug in the socket, a lip integral with the overlay of tough material and projecting forwardly of the body portion, and a hook attaching means projecting rearwardly of the body portion.

6. In a fishing lure of the class described, the combination of a cast body portion of relatively soft material and an overlay of relatively tough material bonded thereto, a socket within the cast body portion, a plug having feathers, hair or the like secured to one end thereof and having its other end within the socket, a clamping screw for securing the plug in the socket, a lip integral with the overlay of tough material and projecting forwardly of the body portion, and a hook attaching bar within the cast body portion and connected with the overlay of tough material and projecting rearwardly of the body portion.

7. In a fishing lure of the class described, the combination of a cast body portion of relatively soft material and an overlay of relatively tough material bonded thereto, a socket, within the cast body portion, a plug having feathers, hair or the like secured to one end thereof and having its other end within the socket, a clamping screw for securing the plug in the socket, and said cast body portion having means for attaching the same to a line, comprising an aperture extending substantially longitudinally of the lure, and a leader extending therethrough.

8. As an article of manufacture, a head for an artificial lure, formed of relatively soft cast material with an overlay of relatively tough material, means on said head for receiving a feathered plug, and means passing through the overlay of tough material for securing the feathered plug thereto.

9. In an artificial fishing lure of the class described, the combination of a cast body member, said body member having formed therein a socket, a plug member having secured to one end thereof feathers, hair and the like and having the other end free to enter the body socket, means associated with one of said members for removably securing the plug member in the body socket, and a lip carried by the body member and projecting forwardly thereof.

10. In an artificial fishing lure of the class described, the combination of a cast body member, said body member having formed therein a socket, a plug member having secured to one end thereof feathers, hair and the like and having the other end free to enter the body socket, means associated with one of said members for removably securing the plug member in the body socket, said body member additionally having formed therethrough an aperture, and a leader passing through the aperture having secured to its rear end a fish hook.

LEHN W. WEESNER.